Figure 1:
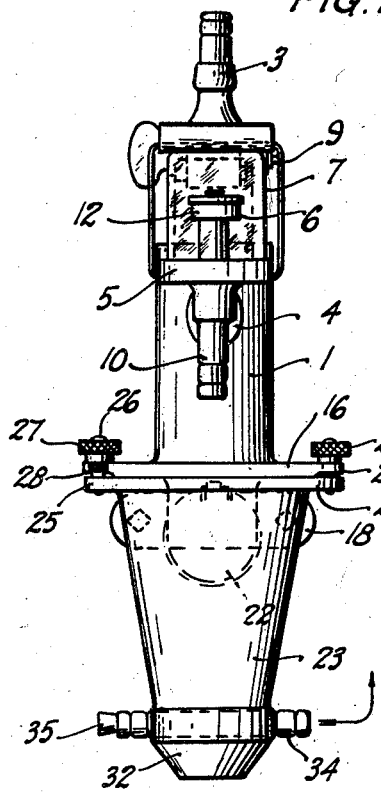

March 20, 1945.  H. R. CLEVERLY  2,371,803

VACUUM BREAK MILKING MACHINE

Filed Jan. 20, 1943

INVENTOR:
HERBERT ROYAL CLEVERLY
BY Haseltine, Lake & Co.
ATTORNEYS

Patented Mar. 20, 1945

2,371,803

UNITED STATES PATENT OFFICE 2,371,803

VACUUM BREAK MILKING MACHINE

Herbert Royal Cleverly, Hamilton,
New Zealand

Application January 20, 1943, Serial No. 472,932
In New Zealand March 12, 1942

6 Claims. (Cl. 31—82)

This invention relates to milking machines of the type known as "vacuum break" milking machines wherein the vacuum as applied to the cow's teats is not continuous, but is applied and interrupted or broken so that the vacuum as actually affecting the teats changes, varying from a maximum to a desired minimum, the objects of the present invention being to provide an improved milking machine unit which will have no slide valves or other moving parts integral or incorporated therewith requiring mechanical drive or operation and will have improved valve means for controlling delivery of the milk from the unit to the overhead milk pipe line which will enable the elimination of milk surge in the down-dropper pipe between said unit and the said overhead milk pipe line, said elimination of surging resulting in steady draw off of the milk and a steadier application of vacuum to the teat cups so that the speed of milking will be increased.

I am aware that there are several known types of vacuum break milking machine, one form having mechanically operated valve means and another form having automatic valves, but with both of these types of machine (when the milk is to be delivered to an overhead milk pipe line) a surging action is caused in the down-dropper pipe between the overhead milk pipe line and the unit because of the intermittency of flow of the milk from the cow, such surging of the milk naturally resulting in reduction in its speed of flow and also having the effect of slowing down the speed of milking.

The older types of machine, wherein the application of vacuum to the cow's teats is transmitted to the latter through a pipe within which the milk is also drawn to the overhead milk pipe line, are extremely subject to this surging action of the milk, the extent of surge being also affected by the head from the teat cups up to the overhead milk pipe line.

Where, as in the case of the vacuum break type milking machines as mentioned, a unit is disposed at a low level, between the level of the teat cups and the level of the overhead milk pipe line, these units will milk much quicker when delivering the milk into an open bucket disposed under the unit as compared with when delivering the milk to the overhead milk pipe line, the loss of speed of milking being essentially caused by the milk surge which takes place between the level of the unit and the level of the overhead milk pipe line, and therefore if such surge is eliminated, its adverse effect on the speed of milking will also be eliminated.

The head between the level of the teat cups and the level of the unit is usually so small that there is substantially little tendency for surge between same, but the teat cups are appreciably influenced by the surge which takes place caused by the much more appreciable head between the unit and the overhead milk pipe line, and therefore if this latter surge is eliminated, an improved result is obviously obtained, the apparatus of the invention eliminating all tendency for surge of the milk between the unit and the overhead milk pipe line.

As an important feature of the invention and for the purpose of eliminating all tendency for surge of the milk between the unit and the overhead milk pipe line, there is a buoyant valve adapted to cover and uncover the milk delivery outlet of the unit through which the milk has to pass in order to be drawn through the down-dropper pipe up to the overhead milk pipe line, and I am aware that buoyant valves of hollow rubber ball type are known for use in the controlling of the flow of milk, but in the present invention the ball valve is disposed in novel manner in relation to the outlet it is adapted to cover and uncover in valve like manner, such novel disposal enabling the obtaining of a desired steady delivery of the milk.

With the known buoyant ball valves, the valve seat on which the buoyant valve rests is located directly below said ball, the weight of the ball plus the vacuum applied at the valve seat tending to hold the ball valve down and the buoyancy of the ball valve tending to lift same from said seat when there is sufficient liquid to float the ball.

The lifting of the ball valve being solely dependent on its buoyancy, it is found that when dealing with the substantially small quantities of liquid as delivered when a cow is being milked, the movements of the ball are erratic, the delivery of the milk from the receiving chamber to the overhead milk pipe line not being a steady flow but more in the nature of a series of gulps.

There are various known milking machines wherein it is required to effect the delivery of milk from a lower level such as the receiving chamber of the unit, to a higher level such as the overhead milk pipe line, some of these milking machines being of the ordinary type and some of vacuum break type, the improved buoyant valve means which controls the delivery of the milk from the unit being characterised by the milk outlet being disposed in a position substantially coinciding with the horizontal axis of the buoyant valve at rest and same being beneficially applicable to effect an improvement of said known milking machines.

Broadly, the invention comprises improvements in vacuum break milking machines wherein interceptor chamber means are connected to means which cause make and break of the vacuum therein, inlet valve means whereby the milk from the cow is admitted to the interceptor chamber means on make of the vacuum but which closes on break of the vacuum within said interceptor chamber means, outlet valve means to said interceptor chamber means which is closed on make of the vacuum in the latter but which opens to permit gravity flow of the milk from the interceptor chamber on break of the vacuum therein, a receiving chamber under atmospheric pressure for receiving the milk gravitating from the outlet valve means of the interceptor chamber, a milk outlet at the bottom of said receiving chamber connected to the overhead milk pipe line and buoyant valve means within said receiving chamber for controlling flow of the milk to the overhead milk pipe line from said receiving chamber.

Figure 2:
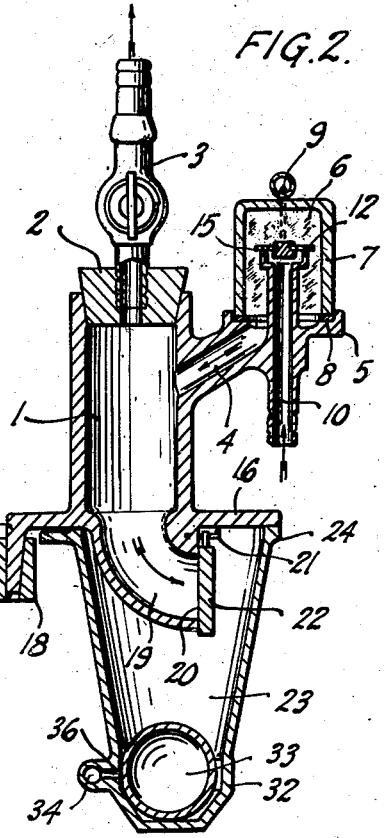
Figure 4:
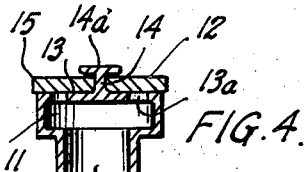
Figure 5:
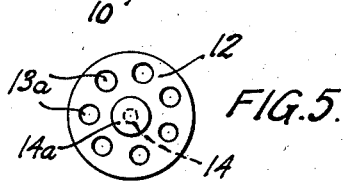
Figure 3:
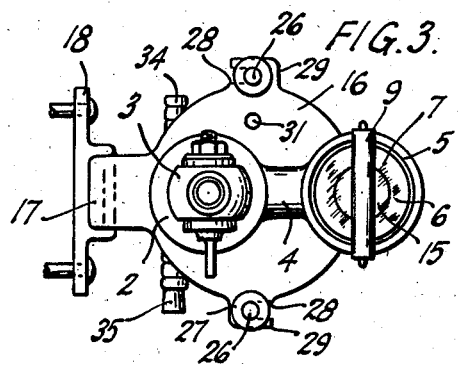

In describing the invention reference will be made to the accompanying drawing in which:

Figure 1 shows a front elevation of the unit,
Figure 2 is a sectional side elevation thereof,
Figure 3 is a plan view of Fig. 2,
Figure 4 is an enlarged sectional elevation of the inlet valve and
Figure 5 is a plan view of Fig. 4 with the valve disc removed.

The milking machine unit comprises an interceptor chamber 1, formed by an enclosed, preferably cylindrical, vessel having its top end closed by a removable rubber plug 2 in which a tap 3 is fitted to present a connection for receiving a rubber tube or like (not shown), which will pass to a pulsator of any suitable known type (not shown), which will effect make and break of vacuum applied via said pulsator to within the interceptor chamber 1.

From the side of the interceptor chamber 1, a connecting pipe 4 passes to and through a flange 5 of a milk inlet valve chamber 6, such chamber 6 being formed by a glass bowl 7 the bottom end of which sits on a rubber or like washer 8 resting on this flange 5, the bowl 7 being clamped to the flange 5 by a known form of stirrup clamp 9 which contacts the closed top of the bowl 7.

An inlet pipe 10 extends vertically through the flange 5, its lower end being adapted to receive the rubber tube or like which passes to the teat cup claw and teat cups, the top end 11 of the inlet pipe 10 which extends concentrically to within the bowl 7 being enlarged to receive the inlet valve 12, (see Figs. 4 and 5), this comprising a flat valve seat 13 through which there are a number of holes 13a, there being a valve holding spindle 14 with upper flange 14a extending centrally up from the valve seat 13 for holding a flexible rubber valve disc 15 over said seat 13, the disc 15 being stretched to engage over the spindle 14 under the flange 14a.

The bottom end of the interceptor chamber 1 has a flange 16 extending therefrom by which the engagement of a lug 17 at the back thereof in a slot of a bracket 18 which is secured to the bail, wall or like, will enable the easy detachable securement or removal of the complete unit, a curved passage 19 extending from the interceptor chamber 1 to below the flange 16, this passage 19 terminating in a vertical valve seat 20 over which is supported by hinge means 21 a flap type delivery valve 22.

This delivery valve 22 opens into a receiving chamber 23 which is located under the flange 16 of the interceptor chamber 1, being of tapered or conical form and having a closed bottom, the flange 16 of the interceptor chamber 1 acting as the top of the receiving chamber 23.

The two chambers 1 and 23 are detachably secured to each other as by providing the receiving chamber 23 with a flange 24 from which extends lugs 25 from which extend studs 26 with nuts 27, the studs being adapted to engage within slots 28 (see Fig. 3) in the lugs 29 extending from the flange 16 of the interceptor chamber 1.

As it is not desired to enable more air to enter the receiving chamber 23 than will maintain same under atmospheric pressure, the mere loose connection of the flanges 16 and 24 with metal to metal is sufficient while at the same time preventing dirt from entry to the receiving chamber 23, but obviously an air entry hole 31 could be provided, such as through the flange 16 as shown in Fig. 3.

The bottom 32 of the receiving chamber 23 is of hemi-spherical or other suitable shape to so receive the buoyant ball valve 33, which controls the flow of milk to the milk delivery outlet 34, that such buoyant valve 33 substantially fills the bottom 32 while at rest, said bottom permitting small movements of the ball valve 33 (which is a hollow rubber ball) in sideways directions and the ball being free to rise vertically.

The milk delivery outlet 34 is in the form of a double ended pipe connected at its centre to the outside of the bottom 32, one end of the pipe being closed by a rubber plug 35 and the other end adapted to receive the down-dropper pipe (not shown) which passes to the overhead milk pipe line (not shown), a small orifice 36 making a connection between the interior of the receiving chamber 23 and the milk delivery outlet 34.

This orifice 36 is in a position to the side and substantially coinciding with the horizontal axis of the ball valve 33 when the latter is at rest, or may be in a little lower position, the object being to cause the ball valve 33 when the latter is at rest to close the delivery outlet orifice 36, it being realised that the degree of vacuum applied at such orifice 36 will draw the surface of the ball 33 into close contact with the orifice.

In use or operation, the unit is secured between pairs of cow bails in the usual manner and the tap 3 at the top of the interceptor chamber 1 is connected to the pulsator which is to apply pulsating vacuum to the said interceptor chamber 1, or in other words make and break of the vacuum therein.

The milk inlet pipe 10 of the milk inlet valve chamber 6 is connected to the milk branch of the teat cup claw and the milk delivery outlet 34 of the receiving chamber 23 is connected to the overhead milk pipe line via the down-dropper pipe.

To effect the milking and delivery of the milk to the overhead milk pipe line, which is under the influence of a continuous vacuum, during the first cycle of operation wherein the pulsator will have caused application or make of the vacuum to the interceptor chamber 1, the flap type delivery valve 22 will be kept tightly closed by the vacuum and the disc 15 of the inlet valve 12 will open so that the vacuum is transmitted to the milk branch of the tea cup claw and to the teats, thereby drawing the milk through the milk inlet pipe 10 and the inlet valve 12 to within the inlet valve chamber 6, from which it flows down connecting pipe 4 into the interceptor chamber 1, such milk flowing down to the bottom of said chamber 1 into the passage 19.

In the second cycle of operation, the pulsator will cause release or break of the vacuum within the interceptor chamber 1, this having the effect of causing the disc 15 of the inlet valve 12 to close, thereby leaving a residual vacuum within the milk inlet pipe 10 and the rubber tube to the cow's teats, this vacuum gradually diminishing in known "vacuum break" manner due to the air admission via the air admission hole usual to teat cup claws.

At the same time, due to the break of the vacuum in the interceptor chamber 1, the flap type valve 22 will be pushed open by the weight of milk contained in said chamber 1 and such milk will flow out into the receiving chamber 23 and as the latter is under atmospheric pressure, what occurs to the milk thereafter can in no way effect or have an influence on the interceptor chamber 1 or the teat cups.

The first cycle of operation is repeated and so on, the milk being delivered to the receiving chamber 23 and as the latter is connected to the overhead milk pipe line which is under the influence of the constant vacuum, such vacuum is transmitted to the milk delivery outlet 34 and to the orifice 36.

By having the delivery outlet orifice 36 to the side, instead of vertically under the ball valve (as is usual), the force in the present case which frees the ball valve 33 from contact with the delivery outlet orifice 36, will be the buoyant force multiplied by the radius of the ball valve 33, and therefore with this leverage action, a very small quantity of milk within the chamber 23 will be sufficient to cause lifting movement of the buoyant valve 33, the result being a steady delivery flow from the receiving chamber 23 and also a tendency to break down formation of froth because of the special arrangement of the outlet orifice 36 and the buoyant valve 33, the maintaining of atmospheric pressure in the receiving chamber 23 and because of substantially no air being taken from said receiving chamber 23 to the overhead milk pipe line.

The milking having ceased, the milk which remains within the down-dropper pipe can be drawn up to the overhead milk pipe line by removing the plug 35 so that air can enter and thereby force the milk up the down-dropper pipe.

As vacuum break effect is obtained only in the interceptor chamber portion of the apparatus, it will be obvious that the improved arrangement of ball valve 33 in relation to the outlet orifice 36 will be applicable to any form of milking machine which requires elevation or delivery of the milk to an overhead milk pipe line subsequent to delivery of the milk from the cow to a receiving chamber or the like.

I claim:

1. In vacuum break milking machines for use with an overhead milk pipe line, an interceptor chamber adapted to be connected to means which cause make and break of the vacuum therein, inlet valve means whereby the milk from the cow is admitted to the interceptor chamber on make of the vacuum but which closes on break of the vacuum within said interceptor chamber, a flap-type delivery valve in a lower portion of the said interceptor chamber which valve is closed on make of the vacuum in the latter but which opens to permit gravity flow of the milk from the interceptor chamber on break of the vacuum therein, the said lower portion of the interceptor chamber extending downwardly into a receiving chamber which is detachably secured to the said interceptor chamber, said receiving chamber being under atmospheric pressure for receiving the milk gravitating from the flap-type delivery valve of the interceptor chamber, a milk outlet at the bottom of said receiving chamber adapted to be connected to an overhead milk pipe line and buoyant valve means within said receiving chamber for controlling flow of the milk to the overhead milk pipe line from said receiving chamber.

2. Improvements in vacuum break milking machines as claimed in claim 1 wherein the inlet valve means whereby the milk from the cow is admitted to the interceptor chamber on make of the vacuum but which closes on break of the vacuum within the interceptor chamber comprises an inlet valve chamber wherein there is a seat for an inlet valve, said seat and valve being disposed on top of an inlet pipe which projects to within said inlet valve chamber, a connecting pipe passing between the inlet valve chamber and the interceptor chamber.

3. Improvements in vacuum break milking machines as claimed in claim 1 wherein the inlet valve means comprises a chamber formed by a glass bowl clamped on top of a flange, said flange having an inlet pipe extending up through its bottom and having a connecting pipe from the interceptor chamber also extending through its bottom.

4. Improvements in vacuum break milking machines as claimed in claim 1 having a milk outlet orifice in the lower part of said receiving chamber disposed in a position substantially coinciding with the horizontal axis of said buoyant valve means at rest.

5. A milking machine as claimed in claim 1 wherein the buoyant valve means consists of a buoyant rubber ball valve and the lower end of said receiving chamber is of substantially hemispherical form of such dimensions relative to the ball valve that said valve is capable of small movements in sideways directions and is free to rise vertically, the said lower end of the receiving chamber having a milk outlet orifice therein so positioned as to substantially coincide with the horizontal axis of said buoyant ball valve while said ball valve is at rest.

6. Improvements in vacuum break milking machines comprising a cylindrical interceptor chamber with a removable plug closing its top in which is fitted a tap for making a connection to a pulsator, a flange near the bottom of said interceptor chamber through which a passage projects having a flap type delivery valve fitted thereto, a lug on said flange by which the unit is adapted to be rigidly mounted on a bail, wall or like, a connecting pipe passing from the side of the interceptor chamber up to and through a flange, a glass bowl clamped on top of said flange, an inlet pipe extending through said flange and having an inlet valve at the top thereof within said glass bowl, a receiving chamber secured to the flange of the interceptor chamber and extending downward therefrom over the flap type delivery valve, a hollow rubber ball within said receiving chamber, an outlet orifice in said receiving chamber disposed substantially on the horizontal axis of the hollow rubber ball when the latter is at rest on the bottom of said receiving chamber, an outlet nipple leading from said orifice and an air hole or like for entry of air to the receiving chamber substantially as described and for the purposes set forth.

HERBERT ROYAL CLEVERLY.